Figure 1:
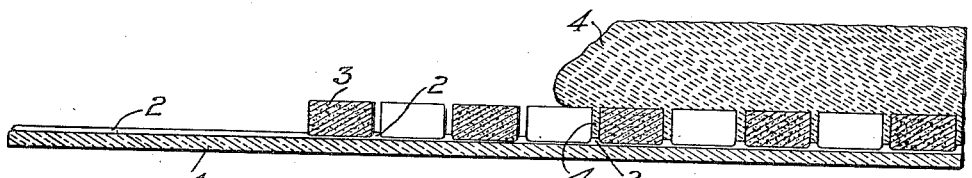

F. P. NALE.
METHOD OF SETTING TILES, BRICKS, AND MOSAICS.
APPLICATION FILED MAR. 26, 1913.

1,082,231.

Patented Dec. 23, 1913.

Witnesses
Wm. C. Prickett
Nonie Welsh

Inventor
Franklin P. Nale.
By Robt D. Johnston Jr.
Attorney

UNITED STATES PATENT OFFICE.

FRANKLIN P. NALE, OF BIRMINGHAM, ALABAMA, ASSIGNOR OF ONE-HALF TO E. J. HUDNALL, OF BIRMINGHAM, ALABAMA.

METHOD OF SETTING TILES, BRICKS, AND MOSAICS.

1,082,231. Specification of Letters Patent. Patented Dec. 23, 1913.

Application filed March 26, 1913. Serial No. 756,999.

*To all whom it may concern:*

Be it known that I, FRANKLIN P. NALE, a citizen of the United States of America, residing at Birmingham, in the county of Jefferson and State of Alabama, have invented certain new and useful Improvements in Methods of Setting Tiles, Bricks, and Mosaics, of which the following is a specification.

My invention relates to a novel method for setting tiles and bricks to form mantels, hearths, floors, walls, and for setting mosaics and any other article wherein it is desired to embed a tile, brick or like article in a concrete or plaster setting, and the object of my invention is to avoid the defacement of the exposed face of the tile (which term is used broadly hereafter to include brick and other articles to be set), due to the fact that mortar, cement, plaster, or other like agent used to hold the tile in place, will, when it gets on the face of the tile, stick to it and deface it.

My improved process contemplates embedding the tile, after they have been arranged in the required design, in a concrete, cementitious, or plaster backing of any desired thickness. In order to do this in the most effective and economical manner it is desirable to lay the tiles face down on the bottom of a mold and after arranging them in the desired manner to produce the ornamental design or mosaic contemplated, I pour over the backs of the tiles concrete, plaster, or any suitable cementitious or bonding mixture which will adhere to the backs and sides of the articles and hold them in place.

It is obvious that if the tiles were merely placed loosely in the bottom of the mold that the wet cement or plaster mixture would work under the faces of the tiles and that in putting the cement in the mold it would tend to slightly disarrange the predetermined spacing of the tiles. To avoid these difficulties, I first coat the bottom or other part of the mold on which the articles to be set will be arranged, with a soluble viscous or non-cementitious plastic composition having just sufficient thickness as a coating to fill and seal only the bottoms of the interstices between the tiles as laid and having preferably a sufficient consistency to hold the tiles in the spaced relationship in which they are assembled. The bottoms of the interstices being thus sealed by the coating in which the face of the tile is buried, it follows that the cement or plaster composition when poured over the tiles will fill the interstices down to the composition coating which prevents the cement from working under the tiles and injuring the face.

In the setting of ornamental tiles and mosaics, it is highly desirable that the workman should be able to inspect the design in its completed form before it is permanently embedded in the cement or plaster base of backing. This presents serious difficulties because, if a tile is accidentally misplaced and the design is embedded in the cement, it is quite difficult to correct the design by substituting the proper tile. In the present state of the art it has been attempted to avoid this difficulty by providing a transparent fabric strip to which the faces of the tiles are caused to adhere and then the design, as thus formed, is then set in a prepared cement bed by having the blocks of the tiles pressed down into the cement. The trouble with this arrangement, however, is that it is impossible to prevent the cement when the moisture thereof strikes the facing cloth from working in under it while the tile design or mosaic is being forced into the cement bed. In fact, that practice is but a slight modification of the long established practice of attaching the faces of the tiles as arranged in a suitable design or mosaic, to a strip of heavy paper or fabric and forcing the backs of the tiles down into a bed of cement. This method of setting tile invariably results in a large number of tiles having the cement or plaster on their exposed faces. According to my process, in order to provide for an inspection of the design before the cement is finally poured into the mold, I provide the mold with a transparent bottom preferably of glass and when the glass bottom is used I prefer to use a coating which will be sufficiently transparent not to interfere with the proper inspection of the design of the tiles through both the glass bottom and the coating.

In carrying my invention into effect I coat the top face of the bottom of the mold or platen, upon which the mosaic or the design of tiles is to be set up, with a plastic or thick liquid composition or coating which may be formed of animal, vegetable or mineral matter non-cementitious in character, which is preferably not oily in its nature and not calculated to discolor or by hardening and adhering thereto injure the face of the tile or brick. The composition is preferably soluble to facilitate its removal from the faces of the tiles after they have been set. I have coated the mold bottom with a paste or syrup made of glucose, sugar, cane syrup or molasses, or even moist clay, the composition being reduced in any suitable manner to a syrupy or pasty condition and spread thinly over the mold with a brush or in any suitable manner. The tiles are then set face down on to the coated face of the mold, the coating being just thick enough to seal the bottom of the interstices between the tile. When the design to be set is ornamental or mosaic, I prefer to use the sugar syrup or clear syrup as it is more transparent than the other compositions mentioned and this I spread over a glass mold bottom or platen. The mosaic, as thus set, can be readily inspected by looking through the bottom of the glass platen and when found correct I pour over the backs of the tiles a composition of cement, or plaster-of-Paris, or cement and plaster-of-Paris, or a like suitable binding agent which will spread over the backs of the tiles and work into the interstices between them and adhere to the tiles so as to hold them set.

A composition having an oily base might be used but the disadvantage is that wherever it touches or works in between the tiles it prevents a bond between the tile and the cement or plaster. Further, the oil is more difficult to remove, and it is liable to discolor the cement or plaster between the tiles as well as to affect the tiles themselves. On the other hand, the compositions I have mentioned will not affect the bond between the tile and the cement or plaster, will discolor neither tile nor plaster, and can be quickly and easily washed off of the face of the finished article. The syrup or sugar when used can be readily recovered after being washed off, so that the expense is nominal and I use so thin a coating that even when not recovered the cost of coating the mold is negligible.

As illustrative of my process, reference is made to the accompanying drawings, in which:—

Figure 2:
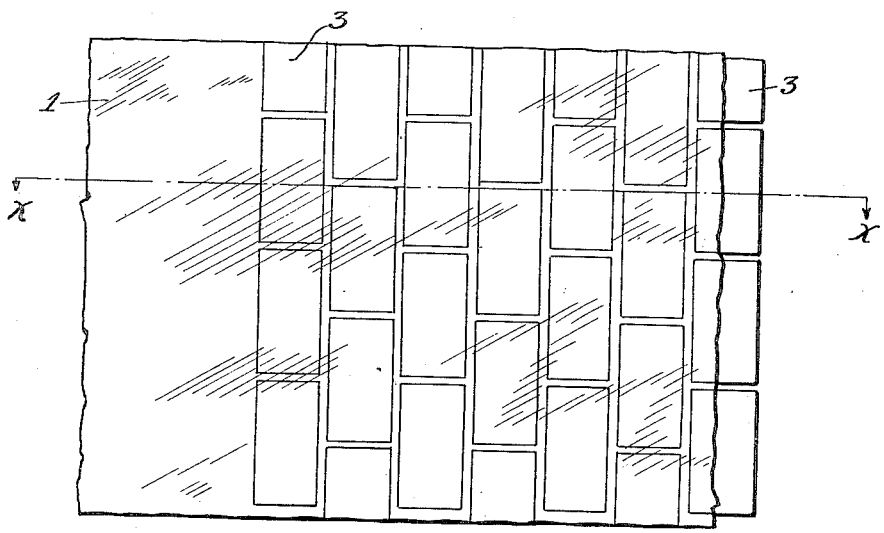
Figure 3:
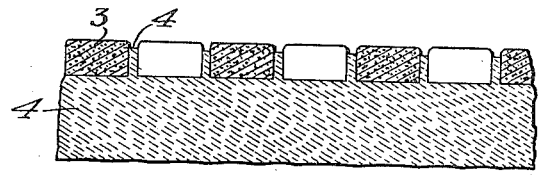

Figure 1 is a cross-sectional view showing the mold provided with a glass bottom or platen, part of which is shown coated, part with the tiles set in the coating, and part with a cement coat over the tiles. Fig. 2 is a bottom view of Fig. 1. Fig. 3 shows the finished article inverted with the composition removed, on a cross section taken along the line x—x of Fig. 1.

Similar reference numerals refer to similar parts throughout the drawings.

According to these drawings, the glass bottom or platen 1 for use with any suitable type of mold, has a coating 2 painted or spread over its upper surface, after which tiles 3 are turned face down and pressed into the coating. Cement or plaster 4 is poured over the backs of and between the tiles and allowed to set. When the finished article is hardened it is removed from the mold and the composition separated from the face of the tile preferably by being washed off, the molded article with the tile inset is ready for use. The drawings, for the sake of clearness, are made to exaggerate the spacing between the tiles and the thickness of the coating.

My invention is particularly applicable for the setting of ornamental brick mantels, for the setting of tiles for hearths and fire places, and for setting tile in concrete sections for building purposes, the molded concrete and plaster articles with the tiles inset being keyed or fastened into place or set in cement.

Where it is desirable to have the plaster which shows between the tiles of any suitable color, my invention permits the use of a specially prepared plaster or cement which is worked down into the interstices between the tile and afterward a main body of cement or concrete of cheaper grade can be applied to form the backing. In the finished article only the more expensive plaster will show between the tiles.

What I claim as new and desire to secure by Letters Patent, is:—

1. The hereindescribed process for setting ornamental tiles and like articles, which consists in spreading a soft composition coating over a platen, embedding the faces of the tiles in spaced relation in such coating until it enters an appreciable distance into the spaces between the tiles to seal the bottoms of such spaces, then pouring over the backs of and into the spaces between the tiles a cementitious or plastic mass which will adhere to the sides and backs of the tiles and permitting it to harden and hold the tiles set permanently therein, and then separating the finished composite article from the platen and composition coating.

2. The hereindescribed process for setting ornamental tiles and like articles, which consists in spreading a soft non-cementitious composition coating over a platen, embedding the faces of the tiles in spaced relation in such coating until it enters an appreciable distance into the spaces between the tiles to seal the bottoms of such spaces, then pouring over the backs of and into the spaces between the tiles a cementitious or plastic mass which will adhere to the sides and backs of the tiles and permitting it to harden and hold the tiles set permanently therein, and then separating the finished composite article from the platen and composition coating.

3. The hereindescribed process for setting ornamental tiles and like articles, which consists in spreading a soft soluble composition coating over a platen, embedding the faces of the tiles in spaced relation in such coating until it enters an appreciable distance into the spaces between the tiles to seal the bottoms of such spaces, then pouring over the backs of and into the spaces between the tiles a cementitious or plastic mass which will adhere to the sides and backs of the tiles and permitting it to harden and hold the tiles set permanently therein, and then separating the finished composite article from the platen and composition coating.

4. The hereindescribed process for setting ornamental tiles and mosaic articles, which consists in coating the upper face of a transparent platen with a substantially transparent thick soft mass of non-cementitious material adapted to seal the interstices between the tiles, then setting the tiles face down on said platen and pressing their faces in spaced relation into said coating until it enters an appreciable distance into the spaces between the tiles and seals the bottoms of such spaces, working a cementitious or plastic bonding compound over the backs of the tiles and into the spaces between them, down to said sealing mass, permitting the bonding compound to harden and then separating the platen and sealing mass from the face of the bonded tiles.

In testimony whereof I affix my signature in presence of two witnesses.

FRANKLIN P. NALE.

Witnesses:
E. J. Hudnall,
R. D. Johnston, Jr.